United States Patent [19]

Brandon

[11] 3,940,527

[45] Feb. 24, 1976

[54] FRICTION ARTICLE OF FLUOROELASTOMERS WITH CALCIUM OXIDE BONDED TO METAL

[75] Inventor: William D. Brandon, Peoria, Ill.

[73] Assignee: Caterpillar Tractor Co., Peoria, Ill.

[22] Filed: Oct. 19, 1973

[21] Appl. No.: 408,166

Related U.S. Application Data

[62] Division of Ser. No. 307,420, Nov. 17, 1972, abandoned.

[52] U.S. Cl. ............... 428/141; 428/421; 428/422; 428/461; 428/469; 156/153; 188/251 A
[51] Int. Cl.² .................. B32B 25/04; B32B 25/02
[58] Field of Search ..... 161/189; 156/153; 428/421, 428/422, 461, 469, 141, 457, 538

[56] References Cited
UNITED STATES PATENTS

| 2,944,927 | 7/1960  | Dosmann ........................ 161/189 X |
| 2,951,783 | 9/1960  | Landrum ........................ 161/189 X |
| 3,007,890 | 11/1961 | Twiss et al. ........................ 260/38 |
| 3,063,882 | 11/1962 | Cheshire ........................ 161/189 |
| 3,107,197 | 10/1963 | Stein et al. ........................ 161/189 |
| 3,501,360 | 3/1970  | Mancel ........................ 156/153 |
| 3,655,727 | 4/1972  | Patel et al. ........................ 260/470 P |
| 3,684,062 | 8/1972  | Johnson ........................ 188/251 R |
| 3,799,832 | 3/1974  | Reick ........................ 161/189 X |

FOREIGN PATENTS OR APPLICATIONS

| 1,153,378 | 5/1969 | United Kingdom |
| 1,158,945 | 7/1969 | United Kingdom |
| 1,188,247 | 4/1970 | United Kingdom |
| 1,199,858 | 7/1970 | United Kingdom |

Primary Examiner—George F. Lesmes
Assistant Examiner—Patricia C. Ives
Attorney, Agent, or Firm—Phillips, Moore, Weissenberger Lempio & Strabala

[57] ABSTRACT

Fluoroelastomers, including ultra high temperature, thermally stable fluoroelastomers, are bonded to a metal backing member by (a) compounding the fluoroelastomers with CaO, (b) curing the fluoroelastomers in contact with a pretreated surface of the metal member, and (c) postcuring the fluoroelastomers/metal unit at elevated temperatures.

2 Claims, No Drawings

FRICTION ARTICLE OF FLUOROELASTOMERS WITH CALCIUM OXIDE BONDED TO METAL

This is a division of Ser. No. 307,420, filed Nov. 17, 1972, now abandoned.

BACKGROUND OF THE INVENTION

This invention relates to bonding fluoroelastomers to metal. More particularly, the invention relates to a method of bonding fluoroelastomers to metal by nonadhesive means.

The fluoroelastomers of this invention are typically relatively chemically inert, thermally stable polymers, owing primarily to the strength of the carbon-fluorine bonds present in the molecule. Because of the thermal stability of these molecules, the fluoroelastomers are desirable in many applications which require elastomeric materials which will withstand high bulk temperature moduli. However, a great number of these applications, particularly in mechanical fields, require the elastomer to be used in conjunction with stiffening, or back-up members, most often fabricated from metal, and hence require a method of bonding the elastomer to the metal member which will provide a bond capable of withstanding high temperatures and sustained or heavy loading. Particular examples include clutch plates and brake linings, where high friction coefficients result in very high ambient temperatures; many other examples will be apparent.

Unfortunately, the inherent properties of the fluoroelastomers, in particular chemical inertness, have made it difficult and, in some instances, impossible to effectively adhere these fluoroelastomers to a metal, especially where high shear or impact strength is required in the finished fluoroelastomer-metal laminate, or where the finished laminate will be exposed to high ambient temperatures. The problem of bonding the ultra-high temperature thermally stable fluoroelastomers has been particularly troublesome.

Prior art methods which have been employed for bonding some types of fluoroelastomers to metal have most commonly involved chemical bonding of the fluoroelastomer to the metal substrate with an adhesive bonding agent. These methods have limited application, however, since with both structural and non-structural adhesives, the bond achieved is not generally capable of withstanding sustained or heavy loading, or high ambient temperatures. Further, the adhesive bonding agent is highly subject to scuffing and wiping during injection and transfer molding of the product, which deactivates or destroys this agent, and therefore molding techniques and mold configurations for fluoroelastomer-metal laminates have heretofore been highly restricted.

BRIEF DESCRIPTION OF THE INVENTION

The present invention provides for the inclusion of an alkaline earth oxide in the fluoroelastomer, which oxides provide the fluoroelastomers with strong bonding abilities when properly applied to a metal back-up member. Calcium oxide is particularly useful for this purpose.

According to the process of this invention, fluoroelastomers are compounded with small amounts of calcium oxide. The compounded CaO-fluoroelastomer is then applied to the metal substrate and cured.

The fluoroelastomers that are particularly benefited by addition of CaO are those available copolymers of hexafluoropropylene and polyvinylidene fluoride, known variously as Viton E60, E60C, and LD2873, available from E. I. du Pont de Nemours and Company, Wilmington, Delaware. and Fluorel 2160, 2170, and FC2170, available from 3M Company, St. Paul, Minnesota.

Broadly, the invention comprises incorporating an amount of calcium oxide, conveniently in powdered form, into the uncured fluoroelastomer to achieve an even dispersion of the CaO therein, applying the compounded fluoroelastomer to a pretreated metal substrate, and then curing the fluoroelastomer. The laminate obtained thereby is then post-cured for a sufficient period of time at elevated temperatures to impart the desired bond strength and obtain the desired physical properties in the cured fluoroelastomer.

It is of importance to pretreat the metal substrate to provide a surface on the substrate receptive to the bond. This can be accomplished, for example, by sandblasting the bonding surface of the substrate, and then oxidizing the sandblasted bonding surface. To achieve a satisfactory bond, the oxidized surface of the metal should be substantially free from foreign substances, including oil or grease.

The compounded fluoroelastomer may be applied to the metal substrate by conventional methods to obtain the desired product, for example by injection, compression or transfer molding techniques, depending generally on the intended configuration of the finished laminate. The fluoroelastomer is then cured at elevated temperatures while in intimate contact with the metal bonding surface; adequate pressure is maintained on the elastomer/metal unit during curing to insure a bond at least sufficient to permit demolding of the laminate.

A stronger bond may in some instances be required to permit successful demolding of the laminate from transfer or compression molds or from complex mold configurations. The fluoroelastomer-metal laminate is then post-cured at elevated temperatures to increase bond strength to desired levels.

Accordingly, it is an object of this invention to provide a method of bonding a fluoroelastomer to a metal backing member without the use of a bonding agent.

It is another object of this invention to provide a method of bonding a fluoroelastomer to a metal member which will produce a fluoroelastomer-metal bond capable of withstanding sustained or heavy loading and/or high ambient temperatures.

It is a further object of this invention to provide a simple method of treating a fluoroelastomer to provide a high strength fluoroelastomer-metal bond when the fluoroelastomer is cured on a metal substrate.

It is an additional object of this invention to provide a simple method of bonding an ultra high temperature thermally stable fluoroelastomer to a metal substrate to achieve a high strength, highly temperature-resistant fluoroelastomer-metal bond.

It is a further object of this invention to expand the molding techniques and mold configurations available for use with fluoroelastomer-metal laminate components.

Additionally, it is another object of this invention to increase the use of fluoroelastomers in applications requiring a strong elastomer-metal bond and high bond strength.

DETAILED DESCRIPTION OF THE INVENTION

It is preferred that the metal back-up member be treated by gritblasting to produce a medium-rough bonding surface; this may conveniently be accomplished by blasting the metal surface with a suitable abrasive. For example, a steel member may be satisfactorily roughened by blasting the bonding surface with $Al_2O_3$ particles having a grit of about 60 to about 180 to produce a surface roughness of about 50 to about 250 microinches. Other abrasives of larger or smaller grit may be found to be more suitable for use in conjunction with other metals, however, or for use in bonding applications other than those specifically illustrated herein.

The sandblasted metal bonding surface is then treated to oxidize the bonding surface thereof. In the case of steel, for example, heating in a forced air oven for from about one hour up to about 6 hours at about 600°F produces a surface oxidation satisfactory for the purposes of this invention. Generally, broad ranges of temperatures, for example from about 300°F to about 1,000°F, with the time varying accordingly, are employable to produce adequate surface oxidation of the metal substrate during heating.

Any other conditions that produce a similar surface oxidation of the metal may alternatively be employed, including the use of appropriate chemical reagents to oxidize the bonding surface. Where oxidation is accomplished by heating the metal, the fluoroelastomer may be applied to the bonding surface while the metal is still hot, or after it has cooled.

Generally, adequate bonds can be obtained for at least up to about two months after a heat oxidation treatment, provided the bonding surface is kept relatively moisture-free, e.g., under humidity-controlled storage, and oil-free. The latter is of importance, as even excessive handling resulting in fingerprints on the bonding surface may interfere with the bonding mechanism.

The particular fluoroelastomer selected for bonding will depend primarily on the intended application of the bonded product. In applications where the product must withstand high bulk temperatures, one of the ultra high temperature, thermally stable fluoroelastomers such as Viton E60, Viton E60C, and Viton LD2873, or Fluorel 2160, Fluorel 2170, and Fluorel FC2170 will usually be selected. In some instances it may be advantageous to combine two or more fluoroelastomers, including those of differing thermal stability properties, to obtain desired properties in the finished laminate.

The fluoroelastomer or a combination of fluoroelastomers is compounded with sufficient amounts of calcium oxide to provide a satisfactory bond between the fluoroelastomer and the metal member under conditions of the process of this invention. Typically, from about three to about 15 parts CaO powder per 100 parts (php) polymer will provide a compounded fluoroelastomer formulation which will have satisfactory bonding properties. Preferably, when the ultrahigh temperature, thermally stable fluoroelastomers such as Viton E60C are to be compounded, a CaO concentration of about 5 php is used.

CaO may of course be incorporated into the elastomer in a form other than powder. A number of dispersions of CaO, both in liquid and paste form are commercially available for incorporation into polymeric materials for conventional use as e.g., dessicants, curing agents, and viscosity agents. These forms of CaO may usually be substituted for the CaO powder at an equivalent actual CaO rate, provided other ingredients in these dispersions do not interfere with the bonding mechanisms.

The calcium oxide is incorporated into the fluoroelastomer by conventional mixing procedures, e.g., in a Banbury mixer, to achieve an even dispersion of the CaO throughout the fluoroelastomer. Other desired ingredients may appropriately be incorporated into the fluoroelastomer in this step, for example, curing agents and accelerators, and carbon black will usually be included.

The compounded fluoroelastomer is then applied to the metal bonding surface by appropriate molding techniques, such as transfer, injection or compression molding. By the process of this invention, many molding techniques and part configurations heretofore unavailable with conventional bonding agents may now be employed. Owing to the nature of transfer and injection molding, and the complexity of many proposed mold configurations, conventional bonding agents for fluoroelastomers are subject to scuffing and/or wiping during the molding process, thereby deactivating or destroying the intended bond, and rendering these techniques and configurations useless.

The process of this invention permits the use of these previously unsuitable molding techniques and mold configurations in addition to the conventional molding techniques and mold configurations employable in prior art processes of fluoroelastomer bonding with bonding agents. Since there is no discrete bonding agent employed in the process of the invention, scuffing and wiping problems are eliminated.

In any event, the fluoroelastomer is pressed into intimate contact with the metal member, while curing of the elastomer takes place, thus insuring an adequate bond between the fluoroelastomer and the metal member. Pressures generally from about 250 to about 1,500 psi of bonding surface will suffice, and pressures of about 800 to about 1,200 psi are generally preferred. Cure times from about 20 minutes at about 325° F to about 90 seconds at about 390° F are generally contemplated; however, the cure time will of course vary according to the ambient temperature, and also individual elastomers and their compounding ingredients may require varying periods of cure time to effect a satisfactory cure. Sufficient curing conditions and adequate pressure to enable the product to be demolded as a unit are at least required. Beyond this, curing conditions may be varied according to the nature of the fluoroelastomer to achieve the desired properties in the cured polymer.

Demolding will usually be facilitated by use of recommended fluorocarbon release agents in the mold. After demolding, the laminate product is postcured for from about 3 to about 20 hours at relatively high temperatures. The preferred temperature range of postcure is from about 400°F to about 500°F, with the time varying accordingly. However, in many instances, depending on the specific fluoroelastomer formulation, including the specific fluoroelastomer employed, temperatures outside this range, for example, above about 350°F will be sufficient to increase bond strength to the desired characteristics, when the post-cure time period is accordingly adjusted. Again, within these ranges, post-curing conditions may be varied according to the nature of the fluoroelastomer to achieve the desired properties in the finished polymer. In general, it may be expected that the bond strength will increase during postcure to levels where the bond strength exceeds stock tear strength over a broad temperature range, at least from about 0°F to about 500°F.

Importantly, a satisfactory elastomer to metal bond will be obtained within the broad mold cure and postcure conditions disclosed herein. Thus, specific conditions within these ranges under which these cures are accomplished, are selected according to the final physical properties desired, and the particular demands of the specific fluoroelastomer.

The following chart contains examples of specific fluoroelastomer formulations which were bonded to a steel member according to the process of this invention:

| Elastomer | PHP | PHP | PHP | PHP | PHP |
|---|---|---|---|---|---|
| Viton B | 100 | | | | |
| B 50 | | 100 | | | |
| E60C | | | 80 | | 100 |
| A-HV | | | 20 | | |
| LD 2873 | | | | 100 | |
| MT Black | 60 | 30–60 | 30–100 | 60 | 30–65 |
| CaO | 15 | 15 | 5–10 | 5 | 5 |
| Accelerators | ←————— As Required —————→ |
| Curatives | ←————— As Required —————→ |

The following charts tabulate the effect of calcium oxide addition on the black-loaded fluoroelastomer formulations based on Viton E60C:

| Composition | Parts/100 parts polymer | | | | |
|---|---|---|---|---|---|
| Compound | A | B | C | D | E |
| Viton E60C | 80 | 80 | 100 | 100 | 100 |
| Viton A | 20 | 20 | | | |
| MT Black (N990) | 60 | 60 | 60 | 60 | 60 |
| Ca(OH)$_2$ | 6 | 6 | 6 | 6 | 6 |
| MgO (Maglite D) | 3 | 3 | 3 | 3 | 3 |
| CaO | — | 5 | — | 5 | 10 |

Mix technique: Preblend all powder ingredients, Banbury mixer

| Mix | | |
|---|---|---|
| 0 minutes | — add polymer |
| 30 " | — add 1/2 preblend |
| 60 " | — add 1/2 preblend |
| 150 " | — bump and brush down |
| 240"–300 " | — dump at 250°F. discharge temperature |

| | A | B | C | D | E |
|---|---|---|---|---|---|
| Cure Times: Min./°F | 3/370 | 3/370 | 1/2/390 | 1/2/390 | 1/2/390 |
| Note: Parts compression molded at 1500 to 6000 psi (2500 psi molding pressure is normal) | | | 1-1/2/390 | 1-1/2/390 | 1-1/2/390 |
| | | | 1-1/2/370 | 1-1/2/370 | 1-1/2/370 |
| Post Cures: Hrs./°F. | 24/450 | 24/450 | 2 | 4 | 6/500 |
| | | | 5 | 8 | 12/475 |
| | | | | 16 | 24/450 |

Steel Preparation:

Grit blasted at 40–70 psi with 60 to 100 grit Al$_2$O$_3$ depending on grade and heat treatment of steel.

100 grit Al$_2$O$_3$ at 40 psi is satisfactory for SAE 1040 – 1080 R$_B$85 steel, and SAE 4140 R$_C$30 steel.

60 grit at 40 psi or 100 grit at 70 psi is satisfactory for nitrided steels.

Treatment in air at 500°– 750°F.

E.g. 6 hrs./500°F; 2–3 hrs./600°F; 1–2 hours/750°F.

Mold part with steel temperature ≈ same as that of mold, ± 20°F.

From the above formulations and test results it will be apparent that the addition of CaO to the fluoroelas-

| Bond Test Results: | | Bond Condition | | | | |
|---|---|---|---|---|---|---|
| Postcure | Test Temperature | A | B | C | D | E* |
| As molded | Demold | Falls Off | OK-Peels | Won't | OK-Peels | OK |
| 2/500 | hrs/°F 500 | | | Falls Off | Good | Exc. |
| 4/500 | " 500 | | | Falls Off | VG-Exc. | Good |
| 6/500 | " 500 | | | Falls Off | Exc. | Peels |
| +24/520 | " 520 | | | — | Peels | Falls Off |
| + 6/600 | " 600 | | | — | Falls Off | Falls Off |
| 4/475 | " 475 | | | Falls Off | VG-Exc. | Exc. |
| 8/475 | " 475 | | | Falls Off | Exc. | Good |
| 12/475 | " 475 | | | Falls Off | Exc. | Peels |
| 16/450 | " 450 | Falls Off | Excellent | Falls Off | Exc. | — |
| 24/450 | " 450 | Falls Off | Exc. | Falls Off | Exc. | — |
| +6/500 | " 500 | Falls Off | Exc. | Falls Off | Good | — |
| 16/450 + 1000 hours in oil at 350°F. | | | | | | |
| | 450 | | Exc. | | Exc. | |
| 2/520 | " 520 | | | | VG | |
| 4/520 | " 520 | | | | Good | |
| 6/520 | " 520 | | | | Poor–Fair | |

*With addition of approximately .3% H$_2$O to base mix (simulated high humidity) Compound E will give results comparable to those shown for Compund D. All test data taken for materials mixed and molded under conditions of controlled humidity 55% R.H. at 75°F.

tomer formulations advantageously affects the bonding to metal backings.

What is claimed is:

1. A high shear and impact resistant friction article useful in clutch assemblies and brake assemblies, comprising a metallic back-up member, a roughened and oxidized surface comprising at least a portion of said metallic back-up member, and a fluoroelastomer selected from the group consisting of copolymers of hexafluoropropylene and vinylidene fluoride, and mixtures thereof, with from about 3 to about 15 parts of calcium oxide per hundred parts of fluoroelastomer evenly dispersed therethroughout, said fluoroelastomer being applied to said roughened oxidized surface and simultaneously cured and in the same operation directly bonded without use of a bonding agent other than said fluoroelastomer-calcium oxide dispersion to said roughened and oxidized surface.

2. The friction article of claim 1 wherein said metallic back-up member is steel.

* * * * *